United States Patent Office 2,908,606
Patented Oct. 13, 1959

2,908,606
ANTIMICROBIAL AGENTS

Philip N. Gordon, Old Lyme, Conn., assignor to Chas. Pfizer & Co., Inc., New York, N.Y., a corporation of Delaware No Drawing. Application July 25, 1956
Serial No. 599,926

10 Claims. (Cl. 167—33)

This invention relates to certain novel antimicrobial agents prepared from streptomycin antibiotics. More particularly, it is concerned with water-soluble complexes of copper and streptomycin antibiotics, which are effective in combatting pathogenic or otherwise undesirable bacteria and fungi, especially plant pathogens.

Streptomycin is the name applied to a well-known antibiotic metabolism product of *Streptomyces griseus*, a microorganism generally found in soils. This antibiotic and its method of preparation are described in the literature, for example in Waksman, "Microbial Antagonisms and Antibiotic Substances," New York, The Commonwealth Fund, 1947, pages 193–200. However, many forms of streptomycin are known, and it is intended to include within the scope of this invention streptomycin in all of its forms. Thus, the expression "a streptomycin antibiotic" embraces not only streptomycin itself, but also its biologically active compounds and derivatives, such as streptomycin sulfate, hydrochloride, nitrate, etc.; as well as the dihydro product, dihydrostreptomycin, dihydrostreptomycin sulfate, hydrochloride and the like.

In accordance with the present invention, highly useful complexes, possessing unusual biological activity, are formed by the interaction of a streptomycin antibiotic and a water-soluble, inorganic cupric salt. The complexes of this invention not only retain the antibacterial activity of the streptomycin antibiotic, but also, they exhibit a high degree of antifungal activity as well. They possess unique properties which could not be expected from the known properties of the streptomycin antibiotics and copper salts from which they are prepared. The solubility of the resulting complexes in water renders them particularly suitable for use in a wide variety of agricultural and industrial applications where combined antibacterial and antifungal activity is desired.

A considerable number of water-soluble, inorganic cupric salts may be employed in preparing the aforesaid complexes, such as cupric sulfate, cupric chloride, cupric nitrate, cupric bromide, and the like. These are advantageously present in the complexes in a molecular ratio of from about 1:2 to about 3:1. In other words, it is preferred to employ a proportion of one molecule of metallic salt to two molecules of the streptomycin antibiotic based upon the streptomycin content thereof, to a proportion of three of salt to one of the antibiotic. Stated differently, the complexes preferably contain from about 0.5 to 3 mols of the copper salt per mol of streptomycin antibiotic. Complexes in which the proportion of metallic salt to the streptomycin antibiotic is less than about 0.5 do not have the highly desirable properties of the preferred complexes. Particularly useful complexes are prepared by employing a 1:1 molar ratio of salt to antibiotic.

The complexes of this invention are preferably prepared by dissolving an acid salt of a streptomycin antibiotic, such as streptomycin hydrochloride or streptomycin sulfate, in water, followed by the addition of the desired water-soluble cupric salt in the appropriate proportions. Alternatively, methanol may be employed as a solvent for the reaction in those instances where methanol-soluble, cupric salts are to be complexed. The complex formation generally requires not more than about ¼ to one hour for completion of the reaction. The reaction proceeds readily at room temperature, although it may be accelerated by moderately elevated temperatures, say up to 50° C. While adjustment of the pH of the reaction solution is not ordinarily necessary, the pH should be maintained between from about 2 to 6. Upon the completion of the reaction, the resulting solution may be dried, as by application of a vacuum or by freeze drying, to obtain the desired complex in dry form. The complexes may also be precipitated from methanolic solution by the addition of a non-hydroxylic solvent, such as ether or hexane. The complexes so obtained usually contain some water of hydration, but this will depend upon the degree of drying to which they are subjected. The symbol "X" is employed herein to designate the number of molecules of water per molecule of complex, it being understood that X may vary from 0 to 10.

The preparation of the complexes of this invention is more particularly illustrated by the following examples, which are not intended to impose any limitation on the invention.

EXAMPLE I

Streptomycin sulfate (14.6 grams, i.e., 0.01 mol) was dissolved in water (25 ml.) to form a straw colored solution. Thereafter, cupric sulfate, $CuSO_4 \cdot 7H_2O$ (5.0 grams, i.e. 0.02 mol) was dissolved in water (15 ml.) and added to this solution. No substantial color change occurred initially. However, after an hour the solution had become a deep green. This solution was then freeze-dried to obtain 18.8 grams of a pale blue product having both antibacterial and antifungal activity. The resulting cupric sulfate complex a streptomycin sulfate was found to have the following formula:

$(C_{21}H_{39}O_{12}N_7)_2 \cdot (SO_4)_3 \cdot 2CuSO_4 \cdot XH_2O$

EXAMPLE II

In like manner, streptomycin trihydrochloride (6.91 grams, i.e. 0.01 mol) was dissolved in methanol (300 ml.), followed by the addition of cupric chloride dihydrate (1.71 grams, i.e. 0.01 mol) in methanol (10 ml.). After about 30 minutes the solution was evaporated to dryness to obtain 6.75 grams of a bright yellow complex having the following formula:

$C_{21}H_{39}O_{12}N_7 \cdot (HCl)_3 \cdot CuCl_2 \cdot XH_2O$

EXAMPLE III

In accordance with the procedure of Example I, streptomycin sulfate (14.6 grams, i.e. 0.01 mol) was dissolved in water (25 ml.), followed by the addition of cupric chloride (3.41 grams, i.e. 0.02 mol). After 45 minutes the color of the solution changed from blue-green to emerald-green. It was then freeze-dried to obtain 18.9 grams of a yellow-green complex of the following formula: 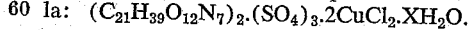 $(C_{21}H_{39}O_{12}N_7)_2 \cdot (SO_4)_3 \cdot 2CuCl_2 \cdot XH_2O$.

EXAMPLE IV

By following this same procedure the following complexes are readily prepared:

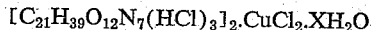
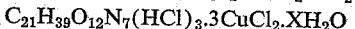
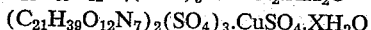
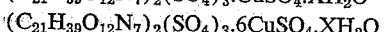
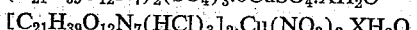
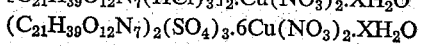

$[C_{21}H_{39}O_{12}N_7(HCl)_3]_2 \cdot CuCl_2 \cdot XH_2O$
$C_{21}H_{39}O_{12}N_7(HCl)_3 \cdot 3CuCl_2 \cdot XH_2O$
$(C_{21}H_{39}O_{12}N_7)_2(SO_4)_3 \cdot CuSO_4 \cdot XH_2O$
$(C_{21}H_{39}O_{12}N_7)_2(SO_4)_3 \cdot 6CuSO_4 \cdot XH_2O$
$[C_{21}H_{39}O_{12}N_7(HCl)_3]_2 \cdot Cu(NO_3)_2 \cdot XH_2O$
$(C_{21}H_{39}O_{12}N_7)_2(SO_4)_3 \cdot 6Cu(NO_3)_2 \cdot XH_2O$ The antibacterial activity of the foregoing complexes is illustrated by the test results set forth in the following table, which indicates the "minimum inhibitory concentration" of representative complexes, i.e. the amount required to inhibit the growth of various bacterial and mycobacteria. These tests were conducted under standard conditions.

*Table I*

| Complex | Minimum Inhibitory Concentration (mcg./ml.) | | |
|---|---|---|---|
| | E. Coli | Proteus vulgaris | Mycobacterium 607 |
| $(C_{21}H_{39}O_{12}N_7)_2.(SO_4)_3.2CuSO_4$ | 25 | 50 | 0.39 p.i.[1] |
| $(C_{21}H_{39}O_{12}N_7)_2.(SO_4)_3.2CuCl_2$ | 50 | >100 | 0.78 p.i.[1] |

[1] P.i. indicates partial inhibition.

It is apparent from the above tests that the complexes of this invention retain the antibacterial activity of the streptomycin antibiotics of which they are composed. However, they also exhibit a high order of antifungal activity.

These combined activities render the complexes particularly unique for combatting agricultural pathogens and for certain industrial applications, as in water treatment, where the control of both fungi and bacteria is essential. The fact that such complexes can be used for agricultural purposes is quite unexpected, since it is well known that water-soluble forms of copper ordinarily cause phytotoxic effects, such as burning, and for this reason, are generally to be avoided. In this case however, the factor of water solubility is a decided advantage, since it facilitates application of the complexes in the form of sprays, and contributes toward a systemic rather than merely surface action.

The efficacy of the complexes of this invention against phytopathogens was determined in a series of foliage tests in which different types of plants were treated with the complexes at various concentrations and subjected to a number of plant diseases. In one of these tests, the streptomycin complex was applied in a concentration of 2000, 400 and 80 p.p.m. in the form of an aqueous spray which was permitted to dry. The plant was bruised lightly on its leaves to form receptor sites for possible infection. A broth culture of the phytopathogen was atomized on the plants until the leaves were thoroughly wetted, thereby subjecting each of the receptor sites to infection. Seven days later the plants were examined for infection on the injured leaves to determine the degree of infection, as evidenced by the appearance of characteristic spots at the receptor sites. Untreated checks were also run. The percentage control of early blight of tomato obtained with the streptomycin hydrochloride-copper chloride complex of Example II is set forth in the following table:

*Table II*

| Complex | Percent Control of Early Blight: Tomato | | |
|---|---|---|---|
| | 2,000 p.p.m. | 400 p.p.m. | 80 p.p.m. |
| $C_{21}H_{39}O_{12}N_7.(HCl)_3.CuCl_2$ | 100 | 100 | 99 |
| Check | 0 | 0 | 0 |

Thus substantially complete control of the infection was obtained with as little as 80 p.p.m. of the complex. No phytotoxic effects were caused by the complex.

In like manner, the same streptomycin hydrochloride-copper chloride complex was tested to determine its effect in controlling halo blight of beans. The results of these tests are indicated below in Table III.

*Table III*

| Complex | Percent Control of Halo Blight: Beans | | |
|---|---|---|---|
| | 2,000 p.p.m. | 400 p.p.m. | 80 p.p.m. |
| $C_{21}H_{39}O_{12}N_7.(HCl)_3.CuCl_2$ | 100 | 100 | 99 |
| Check | 0 | 0 | 0 |

In this case, complete control of halo blight was obtained with 400 p.p.m. of the complex, without any adverse effects on the plants.

In like manner, the efficacy of the streptomycin sulfate-copper chloride complex of Example III and the streptomycin sulfate-copper sulfate complex of Example I was determined against the halo blight of beans. The results of these tests appear below in Table IV.

*Table IV*

| Complex | Percent Control of Halo Blight: Beans | | |
|---|---|---|---|
| | 400 p.p.m. | 200 p.p.m. | 100 p.p.m. |
| $(C_{21}H_{39}O_{12}N_7)_2.(SO_4)_3.2CuCl_2$ | 100 | 67 | 43 |
| $(C_{21}H_{39}O_{12}N_7)_2.(SO_4)_3.2CuSO_4$ | 98 | 87 | 6 |
| Check | 0 | 0 | 0 |

Here, both complexes gave substantially complete control at concentrations of 400 p.p.m. Again no toxic effects were observed.

The efficacy of the aforesaid complexes of Examples I and III in protecting against early blight of tomatoes is set forth in the following table:

*Table V*

| Complex | Control of Early Blight: Tomato | |
|---|---|---|
| | 400 p.p.m. | 80 p.p.m. |
| $(C_{21}H_{39}O_{12}N_7)_2.(SO_4)_3.2CuSO_4$ | 87 | 82 |
| $(C_{21}H_{39}O_{12}N_7)_2.(SO_4)_3.2CuCl_2$ | 91 | 78 |
| Check | 0 | 0 |

Again a high degree of control was obtained without toxic effects.

When tested against late blight of tomato, the foregoing compounds were equally effective, as may be seen from the following table, wherein infection of the plants is rated as follows: 0=none; 0–1=none to slight; 1=slight; 1–2=slight to moderate; 2=moderate; 2–3=moderate to severe; 3=severe.

*Table VI*

| Complex | Degree of Late Blight Infection | |
|---|---|---|
| | 400 p.p.m. | 80 p.p.m. |
| $(C_{21}H_{39}O_{12}N_7)_2.(SO_4).2CuSO_4$ | 0 | 0 |
| $C_{21}H_{39}O_{12}N_7.(HCl)_3CuCl_2$ | 0–1 | 1 |
| $(C_{21}H_{39}O_{12}N_7)_2.(SO_4)_3.2CuCl_2$ | 0 | 0 |
| Check | 3 | 3 |

Thus substantially no infection was observed when the three complexes were applied at concentrations of 400 p.p.m.; even at 80 p.p.m. one effected complete protection, whereas with the others, infection was only slight. No phytotoxicity due to the complexes was observed.

Because of their high solubility in water, the complexes of this invention are readily incorporated in aqueous solutions to form sprays suitable for application to plants, and the like, to protect the same against both bacterial and fungal infection. They may also be incorporated into water systems where it is desired to control bacterial and fungal contamination. However, the application of these complexes is not limited to spray forms, since emulsions, dusting powders, concentrates and the like may also be employed, wherein the active ingredient may range from about 1 to 95% by weight of composition on an activity basis. These compositions may include inert carriers such as pyrophyllite, various clays, diatomaceous earth, etc. If desired, they may also include wetting agents and stabilizers, and in some instances, even insecticides.

The preparation of dry concentrates which may be diluted with water immediately before use, as in agricultural sprays, is particularly advantageous. Such concentrates may be composed of the aforesaid complexes or they may include suitable proportions of a water-soluble, inorganic cupric salt and a streptomycin antibiotic in uncomplexed form, which upon dissolution in water will form the desired complex in a predetermined concentration.

The amount and concentration of the complexes of this invention to be employed against a particular plant disease, or to be employed for general control of bacterial and fungal microorganisms, will, of course, vary considerably. In the agricultural field, the type of plant or tree, the disease involved, the time of year, weather conditions, and the stage of development of the plant, are among the many factors which are to be considered in this respect. For most purposes, it is preferred to apply the streptomycin antibiotic-copper complex in concentrations ranging from about 80 to 500 p.p.m. to obtain the desired degree of control. It will be appreciated, however, that larger or smaller amounts may be employed to meet the needs of individual situations.

What is claimed is:

1. A process for the preparation of a water-soluble complex of a streptomycin antibiotic and a water-soluble, inorganic salt of copper, which comprises reacting a streptomycin antibiotic in a solvent selected from the group consisting of methanol and water, with from about 0.5 to 3 molecular proportions of water-soluble, inorganic cupric salt, while maintaining the reaction solution at a pH between about 2 and 6.

2. A water-soluble complex of a streptomycin antibiotic and from about 0.5 to 3 molecular proportions of a water-soluble, inorganic cupric salt, characterized by a high degree of antifungal activity.

3. A water-soluble complex of streptomycin hydrochloride and about 1 molecular proportion of cupric chloride, characterized by a high degree of antifungal activity and having the approximate empirical formula $C_{21}H_{39}O_{12}N_7.(HCl)_3.CuCl_2.XH_2O$ wherein X is a number from 0 to 10.

4. A water-soluble complex of streptomycin sulfate and about 1 molecular proportion of cupric chloride, characterized by a high degree of antifungal activity and having the approximate empirical formula $$(C_{21}H_{39}O_{12}N_7)_2.(SO4)_3.CuCl_2.XH_2O$$

wherein X is a number from 0 to 10.

5. A water-soluble complex of streptomycin sulfate and about 1 molecular proportion of cupric sulfate, characterized by a high degree of antifungal activity and having the approximate empirical formula $$(C_{21}H_{39}O_{12}N_7)_2.(SO_4)_3.CuSO_4.XH_2O$$

wherein X is a number from 0 to 10.

6. A water soluble complex of streptomycin hydrochloride and about 1 molecular proportion of cupric sulfate, characterized by a high degree of antifungal activity and having the approximate empirical formula $$C_{21}H_{39}O_{12}N_7.(HCl)_3.CuSO_4.XH_2O$$

wherein X is a number from 0 to 10.

7. A water-soluble complex of streptomycin hydrochloride and about 1 molecular proportion of cupric nitrate, characterized by a high degree of antifungal activity and having the approximate empirical formula $$C_{21}H_{39}O_{12}N_7.(HCl)_3.Cu(NO_3)_2.XH_2O$$

wherein X is a number from 0 to 10.

8. An aqueous spray for inhibiting the growth of bacteria and fungi, composed of an aqueous solution containing from about 80 to 500 p.p.m. of a water-soluble complex of a streptomycin antibiotic and from about 0.5 to 3 molecular proportions of a water-soluble, inorganic cupric salt.

9. A dry composition suitable for extemporaneous dissolution in water to form a streptomycin antibiotic-copper complex, characterized by a high degree of antifungal activity, which comprises a streptomycin antibiotic in physical admixture with from about 0.5 to 3 molecular proportions of a water-soluble, inorganic cupric salt.

10. A method for combatting industrial and agricultural bacteria and fungi which comprises applying to the habitat of such a microorganism, a composition containing a water-soluble complex of a streptomycin antibiotic and from about 0.5 to 3 molecular proportions of a water-soluble, inorganic cupric salt.

References Cited in the file of this patent

UNITED STATES PATENTS 2,777,791 Visor et al. ............ Jan. 15, 1957

OTHER REFERENCES

Foye et al.: "Journal of the American Pharmaceutical Association," vol. XLIV, May 1955, No. 5; pp. 261 to 263 relied on.